(12) United States Patent
Kreuzer et al.

(10) Patent No.: US 7,383,939 B2
(45) Date of Patent: Jun. 10, 2008

(54) DEVICE AND METHOD FOR HANDLING WORKPIECES IN PARTICULAR VEHICLE CHASSIS

(75) Inventors: Bernd Kreuzer, Lauterbach (DE); Manfred Fottinger, Giessen (DE)

(73) Assignee: Durr Systems GmbH, Stuttgart (DE)

( * ) Notice: Subject to any disclaimer, the term of this patent is extended or adjusted under 35 U.S.C. 154(b) by 0 days.

(21) Appl. No.: 10/505,388

(22) PCT Filed: Feb. 20, 2002

(86) PCT No.: PCT/EP02/01782

§ 371 (c)(1), (2), (4) Date: Feb. 28, 2005

(87) PCT Pub. No.: WO03/070545

PCT Pub. Date: Aug. 28, 2003

(65) Prior Publication Data

US 2005/0139451 A1 Jun. 30, 2005

(51) Int. Cl.
*B05C 3/00* (2006.01)
(52) U.S. Cl. ............... 198/468.9; 198/378; 198/465.1; 198/468.01; 118/416; 118/426
(58) Field of Classification Search ............... 198/378, 198/465.1, 468.01, 468.9; 118/416, 426
See application file for complete search history.

(56) References Cited

U.S. PATENT DOCUMENTS

| 4,411,354 | A | 10/1983 | Thibault et al. |
| 4,928,383 | A | 5/1990 | Kaczmarek et al. |
| 5,088,176 | A * | 2/1992 | Koga ........................... 29/430 |
| 6,390,279 | B1 | 5/2002 | Furukoshi |
| 6,419,983 | B1 | 7/2002 | Kreuzer |
| 6,673,153 | B2 * | 1/2004 | Ehrenleitner et al. ....... 118/423 |

FOREIGN PATENT DOCUMENTS

| DE | 3906857 | 5/1990 |
| DE | 19641048 | 4/1998 |
| DE | 201 05676 | 6/2001 |
| EP | 0030882 | 6/1981 |
| EP | 1020347 | 7/2000 |
| GB | 2225294 | 5/1990 |
| WO | 98/15359 | 4/1998 |
| WO | 02/04279 | 1/2002 |

\* cited by examiner

*Primary Examiner*—Gene O. Crawford
*Assistant Examiner*—Leslie A Nicholson, III
(74) *Attorney, Agent, or Firm*—Dilworth & Barrese LLP

(57) ABSTRACT

A device (10) is provided for handling workpieces, in particular vehicle chassis (22) of modular construction, and having a first module with a handling line (12) in turn having one or several handling regions (14) for surface handling of the workpieces (22), and a guide device (44) along the handling line (12). A second module has one or several carriages (20b) to which the workpieces (22) may be fixed and moved along the guide device (44). Various types of second module may be combined with the first module to achieve various configurations of the whole device (10) with regard to throughput and flexibility.

18 Claims, 11 Drawing Sheets

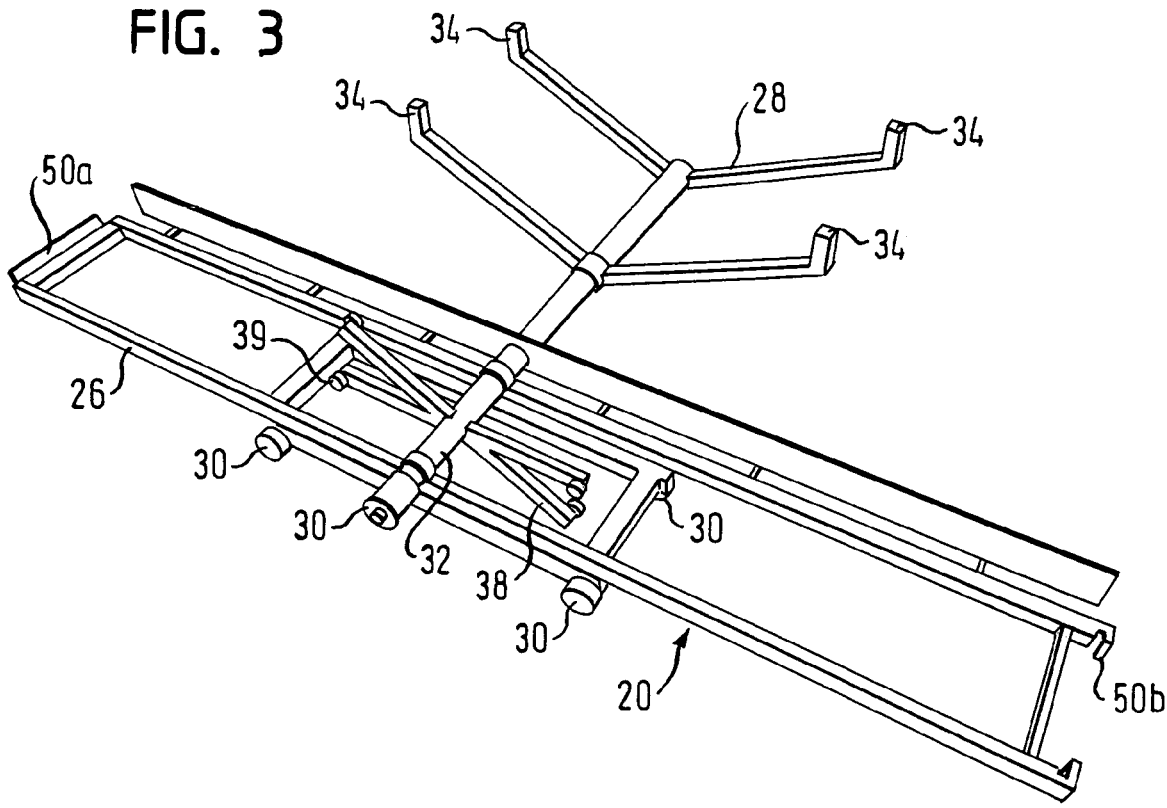
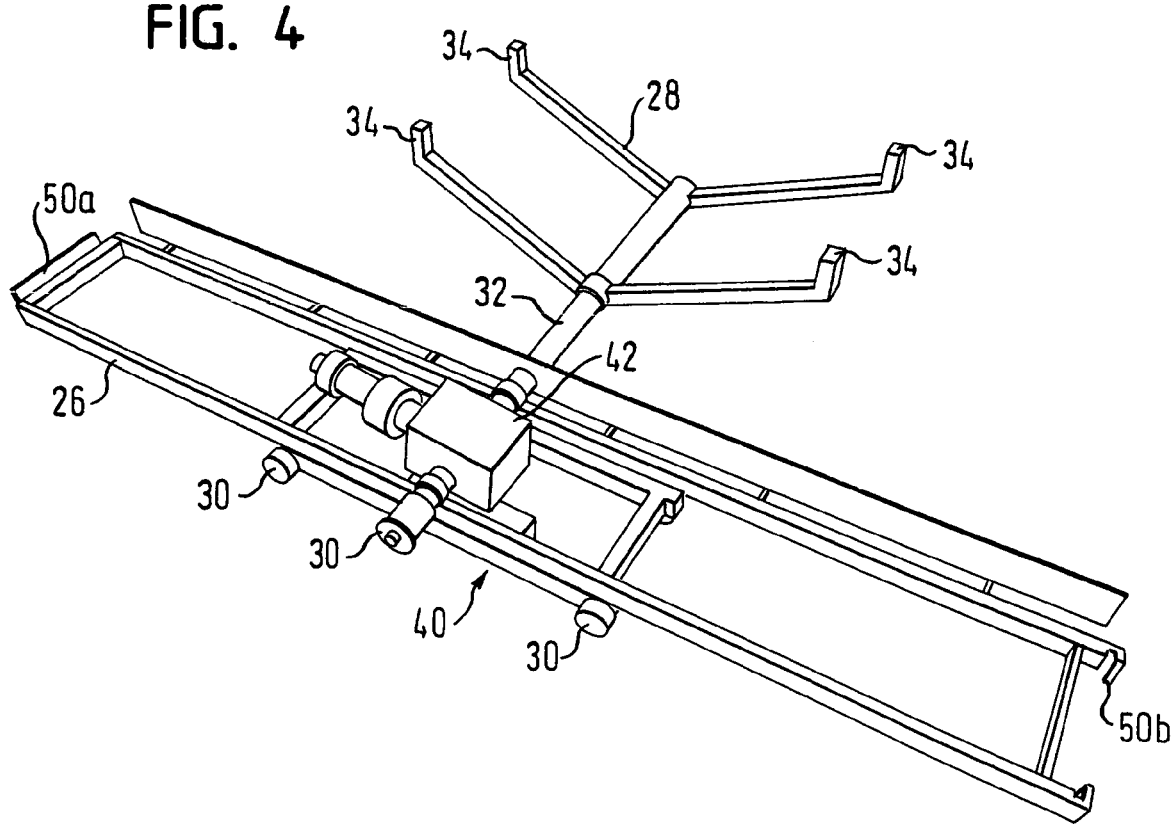

DEVICE AND METHOD FOR HANDLING WORKPIECES IN PARTICULAR VEHICLE CHASSIS

BACKGROUND OF THE INVENTION

1. Field of the Invention

The invention relates to a device and method for handling workpieces, in particular vehicle chassis.

Such a system comprises a handling line having a plurality of successive handling regions in which the workpieces are introduced for surface treatment.

A handling region may, for example, be an immersion tank containing a treatment fluid, but the term handling region may be defined as any kind of booth or tank whenever a workpiece undergoes treatment therein. Such treatment may include, for example, a washing operation. Other examples include immersion phosphating, pre-treatment for immersion coating, powder coating, wet-paint coating and the like.

2. Prior Art

Previously known devices for the surface treatment of workpieces such as vehicle chassis in immersion baths or treatment booths are divided into continuously conveying devices and discontinuously conveying devices.

In the case of continuously conveying systems, the chassis are fastened inside suspension gear and a chain drive is used to convey them along the handling line, lower them into the immersion baths, convey them through the immersion baths and lift them out of the immersion baths again. A continuously conveying system for the surface treatment of vehicle chassis is described in DE 196 41 048 A1. In this device, the vehicle chassis are each held by rotary frames that are moved a fixed distance apart from one another at a uniform speed with the aid of a common conveying means above a plurality of treatment tanks. The vehicle chassis are introduced into and removed from the immersion baths by means of a selective rotational movement that can be coupled rigidly, via guide rails, to the translatory movement of the rotary frames. The rotary frames are guided by a revolving chain system and are therefore guided rigidly in relation to one another and at a continuous speed, both in the region of the handling line above the immersion baths and during return travel.

Discontinuously conveying systems are known in the prior art, too and are referred to as cyclical systems. In the case of cyclical systems, the vehicle chassis are moved on article mounts over the immersion baths, stopped there and dipped into the treatment bath with the aid of lifting means, such as hoists or swivel gear, and, after the process time has elapsed, the chassis are lifted or swivelled out of the bath again.

An example of such a system is described in DE 43 04 145 C1 or DE-U-200 22 634.7.

Choosing between a continuously conveying device and a discontinuously conveying device must take account of the specific pros and cons of both basic ideas. For instance, the continuously conveying devices are more reliable because their operation requires fewer drive motors, whereas the individually timed article mounts of cyclical systems are more likely to malfunction as a result of the plurality of individually controlled motors. The maximum throughput of workpieces per time unit in the case of continuous devices is, furthermore, higher than that of cyclical systems. The advantage of cyclical systems, on the other hand, is the high degree of flexibility regarding workpiece handling as a result of the ability to individually drive the individual article mounts.

In the automotive sector, efforts are being made to operate the systems with high throughputs. At the same time, however, a high degree of process flexibility is desired as well, because once a system has been set up in an automotive plant, it may be intended to perform different workpiece-handling operations in the future.

SUMMARY OF THE INVENTION

The invention is based on the object of designing a device and method for handling workpieces, in particular vehicle chassis, which combines the advantages of a high throughput with the advantage of a high degree of flexibility.

This problem is solved by a device comprising the features of modular construction for handling workpieces (22), in particular vehicle chassis (22), having a first module, in turn, having a handling line (12) with one or more handling regions (14) for the surface treatment of workpieces (22) and a guide device (44) along the handling line (12) and a second module having one or more carriages (20; 40; 60) to which the workpieces (22) may be fixed and which may move along the guide device (44), wherein various tynes of second modules may each be combined with the first module and method comprising the features of initially transporting a workpiece by first conveying means to a first transfer station, pivoting a carriage up around a pivoting shaft until the carriage holds the workpiece, nassing through the handling line as far as a second transfer station while performing an additional, sectional rotational movement for introducing the workpiece into, or removing it from, one or more handling regions, pivoting the carriage down around the pivoting shaft in the region of the second transfer station, and at the same time removing the workpiece by a second conveying means, and transporting the carriages that have been pivoted through approximately 90 degrees out of the horizontal plane back to the first transfer station. Advantageous embodiments of the device and method according to the invention are described.

The invention is based on the idea of designing a device of modular construction for handling workpieces, in particular vehicle chassis. A first module comprises a handling line having one or several handling regions, such as immersion baths, for the surface treatment of workpieces, and further comprises a guide device along the handling line. A second module comprises a plurality of carriages to which the workpieces may be fixed and which may be moved along the guide device, i.e. along the handling line.

The essence of the invention lies in that various types of second module may each be combined with the first module. In this way, carriages that themselves do not have any drive motors and which are forcibly guided through the device essentially by way of the aforementioned continuous means can be used in the device. Yet carriages that have their own travel drive as well as separate rotary drives for moving the workpieces into the immersion baths, moving them within the immersion baths and removing them from the immersion baths can also be used in the device. Combined with the unvarying first module, these carriages ensure the features of cyclical systems. Apart from the two aforementioned carriages resembling holding frames in the case of continuously conveying systems and the article mounts of cyclical systems, it is, however, possible to conceive of intermediate solutions, which will be described below as hybrid solutions. Thus, it is, for example, feasible to use carriages in the device according to the invention that do not have their own travel drive and which are therefore forcibly guided along the handling line, whereas the carriages have a separate rotary drive and consequently it is possible to individually control the rotational movement, even to the extent of "skipping" individual handling regions. Conversely, the device according to the invention may, furthermore, be equipped with carriages that each have their own travel drive, but in which the rotational movement is forcibly coupled to the translatory movement of the carriages, as is the case in the above-described continuously conveying system according to DE 196 41 048 A1. Such hybrid solutions therefore lie midway between the above-described basic ideas of a continuously conveying device and of a cyclical system.

As far as operators of the device according to the invention are concerned, it is therefore possible to refit, with little outlay, the entire system in that they can switch between a continuously conveying system, a cyclical system and the aforementioned hybrid solution. Thus, for example, the system can be operated on a continuously conveying basis when the device is used to coat vehicle chassis, as long as the aim is maximum throughput for mass production, whereas if the production quantity is reduced or if the corresponding model is being phased out, the device can be converted into a cyclical system in that merely a different second module is combined with the first, unvarying basic module.

A further advantage of the device according to the invention is that as part of small batch production, manufacturing costs can be reduced as a result of largely using common components between varyingly configured devices.

To accomplish a flexible solution as described above, the carriages cannot be guided on a revolving chain throughout the entire system, because this would contradict the basic idea underlying a cyclical system and a hybrid system with its own travel drive. For this reason, the carriages must be guided such that only if required will they be guided in relative to one another, so to speak, as a rigid unit within the region of the handling line. The method according to the invention for handling workpieces, in particular vehicle chassis, is therefore characterized in that the workpieces are transported, initially by a first conveying means, to a first transfer station in which the workpieces are joined to the carriages. For this purpose, a carriage is swung up around a pivoting shaft until the carriage holds the workpiece. The workpiece held on the carriage then passes through the handling line as far as a second transfer station at the end of the handling line, with an additional, sectionally rotational movement taking place in order to introduce the workpiece into or remove it from one or more handling regions. After the workpiece has reached the second transfer station, the carriage swings down around the pivoting shaft and at the same time the workpiece is carried away by a second conveying means. The carriages pivoted through approx. 90° out of the horizontal plane are transported back to the first transfer station.

According to a preferred embodiment, the guide device is disposed merely on one side of the handling line. That member of the device which is to be made available for potential maintenance is covered by this measure, and space is saved, too. If the entire device is configured to include a continuously conveying system, the rotary shafts can, furthermore, be shorter in design in order to effect rotation of the workpieces, since these have to be disposed only on one side of the carriages.

The guide device preferably comprises at least one rail. This constitutes the simplest design for a guide device.

In this embodiment, the carriages preferably have rollers that roll on the at least one rail of the guide device and which at the same time accurately define the position of the carriages relative to the rails.

According to a preferred embodiment of the invention, the first module additionally comprises a return means, preferably in the form of a conveyor belt or chain conveyor, for conveying the carriages from the second transfer station to the first transfer station. The use of a conveyor belt represents a simple idea based on mounting the carriages in a friction-fit manner. Conveyor belts or chain conveyors permit the carriages to be returned in any position and at a speed that is independent of the average speed of the carriages in the region of the handling line. By providing an independent return member, the flexibility of the entire device can be further increased, and the return means can be used as a carriage buffer.

If the return means is adapted such that the carriages are conveyed from the second transfer station to the first transfer station in a shorter time than it takes the carriages to be conveyed from the first transfer station to the second transfer station, a complete system will require fewer carriages. In the case of carriages that have their own travel drive, no conveying means is needed in the region of return travel, because these carriages move independently. While maintaining a uniform throughput of workpieces to be handled, rapid return entails the use of fewer carriages in the device, since the dwell time in the region of return travel is shorter.

As already described above in conjunction with the method according to the invention, the device is preferably designed such that the carriages in the second transfer station are pivoted through an angle of approx. 90° around a pivoting shaft in the region of the guide device, and that the carriages in the first transfer station are pivoted back through the same angle in the opposite pivoting direction. This solution has the advantage that during return travel, the carriages take up just a small amount of space within the overall device. This is due to the fact that the carriages can be returned upright next to the treatment baths.

Depending on the system configuration, however, the carriages can also be returned upright above the handling line. This is desirable whenever the workpieces to be handled and being transported from the first conveyor means to the first transfer station are to be gripped by the carriages from above. In this case, it is advisable to upwardly pivot the carriages in the region of the second transfer station from the workpieces to be handled and correspondingly to downwardly move the region of the first transfer station back close to the workpieces to be handled. In accordance with the preferred embodiment of the invention, however, the movement is effected in precisely the opposite direction. In the region of the second transfer station, the carriage are, so to speak, tilted away underneath the workpieces, are pivoted through approx. 90° around the pivoting shaft in the region of the guide device, are conveyed at an increased speed back to the first transfer station, where they are pivoted from below back close to the workpieces to be handled until these are held by the pivoting means.

The pivoting shaft is preferably disposed essentially parallel to the guide device and on that side of the guide device and of the carriages which faces away from the one or more handling regions. The suitable location of the pivoting shaft enables the carriages to be pivoted into the return position in such a way that during return travel, they do not collide with the guide device or carriages on the handling line.

The carriages and guide device are preferably designed such that when the workpieces are being handled, all the bearings and joints are each disposed outside the one or more handling regions. If there is a plurality of immersion baths of the type mentioned at the start, either it will be necessary to take special sealing measures to prevent the treatment fluids from penetrating the bearings, or the service life of the bearings and joints will be reduced accordingly. Particular preference is therefore given to a suitable arrangement of the bearings and joints outside the handling regions.

The carriages preferably comprise an outer frame and an inner frame that revolves around a rotary shaft relative to the outer frame, with the workpieces being attachable to the inner frame. This design enables the carriages to move with the outer frame along the guide device in the region of the handling line, while the complex rotational movements adapted to the respective handling region are performed only by the inner frame with the workpiece attached thereto. In particular, this design has the advantage that if carriages which create a continuously conveying system are used, the individual carriages can be coupled together easily, since the outer frames do not undergo the complex rotational movements of the workpieces.

According to a preferred embodiment, the rotary axis is disposed in an essentially horizontal and perpendicular manner relative to the direction of the carriages' movement along the handling line.

A continuously conveying system can be obtained by choosing special-purpose carriages that can be coupled together in the region of the first transfer station and which can be separated from one another in the region of the second transfer station. Consequently, in the region of the handling line, the carriages can each be conveyed at a specified distance in relation to one another, and, like a train, the carriages can be pulled or pushed through the handling line. At the same time, however, the aforementioned rapid return of the carriages from the second to the first transfer station is made possible by the separation of the carriages from one another in the region of the second transfer station, and the number of carriages to be used in total can, moreover, be reduced in the case of a continuously conveying system.

In this embodiment of the invention, it has proved particularly advantageous to equip the outer frames of the carriages with front coupling members and rear coupling members that are designed so that the rear coupling member of each carriage can form a detachable form-locked connection with the front coupling member of the following carriage. This design makes it unnecessary to adjust chains, and while the carriages are being pivoted in the region of the first transfer station and second transfer station, the carriages are easy to connect together and separate from one another again in that a form-locked connection which acts only on the horizontal plane is formed, and in that when the carriages pivot downwards or upwards through 90°, the coupling members can engage with the complementarily shaped coupling members of an adjacent carriage.

According to a preferred embodiment, the carriages, furthermore, have a connecting means, preferably a hook-shaped projection, disposed in the region of the outer frame, with which projection a pulling means can interact. Such a pulling means or drive means is advantageously disposed in the region of the second transfer station and is designed such as to form a detachable connection with the connecting means of that carriage which is nearest to the second transfer station in the region of the handling line, whereby this carriage can be forcibly conveyed, by the pulling means, to the second transfer station. That carriage which is nearest to the second transfer station in the region of the handling zone is therefore coupled in a manner similar to a train and is forcibly conveyed, with the aid of the pulling means, to the second transfer station, from where the workpiece is accepted by the second conveying means and transported away, and the carriage is simultaneously detached from the workpiece. The detachment of the carriage from the workpiece simultaneously disengages the connection both with the pulling means and the coupling connection with the following carriages in the region of the handling line. Consequently, the pulling means must then once again establish a connection with that carriage which is nearest to the second transfer station in the region of the handling line. This solution is very simple and permits continuous conveyance by way of the described pulling technique. Alternatively, however, it is possible to use a pushing means which is disposed in the region of the first transfer station and pushes the carriages connected together toward the second transfer station.

The second module, furthermore, preferably comprises a control means in the region of the guide device which interacts with the carriages such as to control a relative rotational movement between the outer frame and inner frame around the rotary shaft. This embodiment relates to a continuously conveying version or to one of the two possible hybrid versions in which the carriages do not have their own rotary drive. The translatory movement of the carriages, with the aid of the guide device, therefore controls the relative rotational movement between the outer frame and inner frame and guides the immersion of the workpieces into the treatment baths.

The control means according to this embodiment comprises preferably a guide rail with inclined guide portions, which rail interacts with a lever assembly connected in a torsionally rigid manner to the inner frame. This type of control means is simple to put into effect and is largely maintenance-free, while it is possible to produce a controlled rotational movement that is under control at any time.

As part of the modular construction according to the invention, the carriages may have a rotary drive on each carriage, which drive is connected to the carriages' inner frame in a torsionally rigid manner at the output side.

Additionally, the carriages may have both a travel drive for the translatory movement of the carriages along the handling line and a rotary drive for the rotational movement of the inner frame relative to the outer frame, with the translatory movement being independent of the rotational movement. When they form part of the second module, such carriages turn the overall device into a cyclical system.

Finally, the carriages may have a means for lifting or lowering the rotary shaft in order to rotate the inner frame relative to the outer frame. This can be effected in any manner known to the person skilled in the art, for example by means of a knuckle-joint guidance mechanism. Furthermore, it is possible to pivot the rotary shaft in that as an alternative to or in addition to lifting or lowering this shaft, it is positioned at an angle.

If carriages that have their own travel drive and/or rotary drive are used, information and/or power is transferred from the first module to the carriages in a preferably contactless manner, particularly inductively. This solution is less prone to malfunctioning than the alternative solution that uses sliding contacts.

A BRIEF DESCRIPTION OF THE DRAWINGS

The invention will now be described by way of examples based on the attached figures, in which FIG. 1 is an overall view of a device according to the invention in the region of the second transfer station;

FIG. 3 shows an embodiment for a carriage without its own drive;

FIG. 4 shows a carriage with its own rotary drive, though without its own travel drive;

DESCRIPTION OF THE PREFERRED EMBODIMENTS

The following embodiments of the invention each use identical reference numbers to refer to identical parts.

Figure 1:
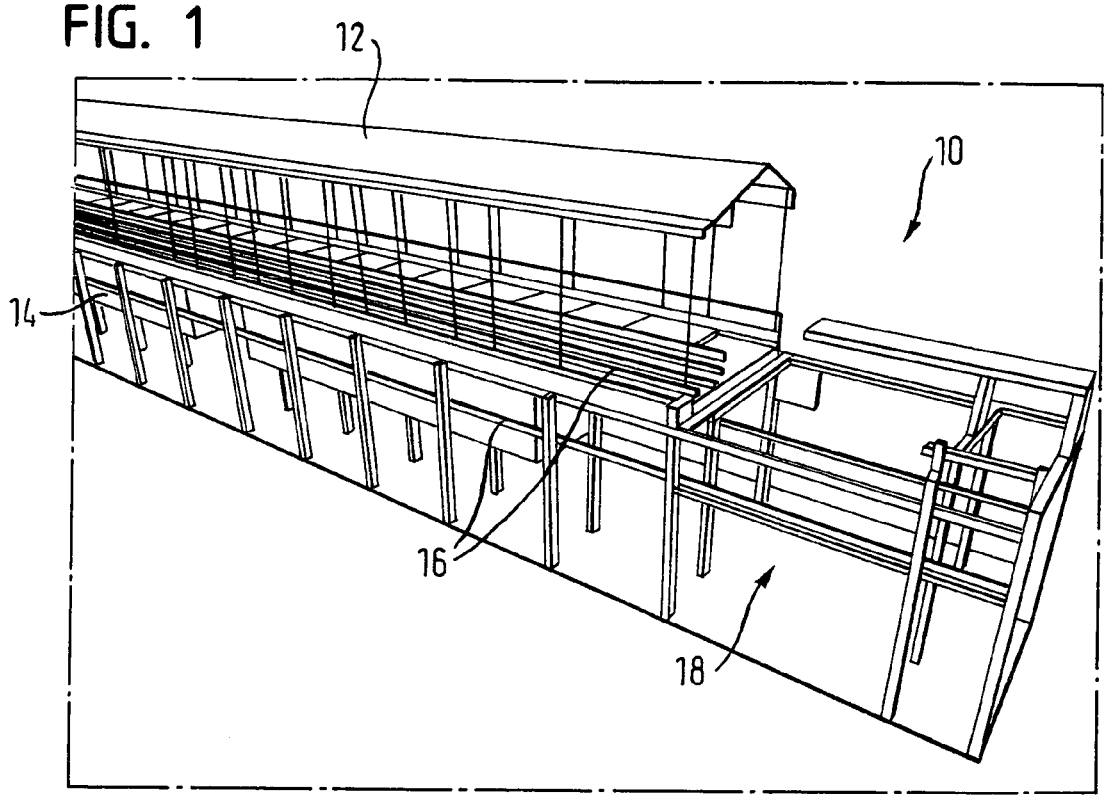

FIG. 1 shows a schematic view of a device according to the invention, which device is used to coat automotive chassis. The basic principles of the device are, however, equally applicable to other systems having different handling stations for the handling of workpieces. The overall system 10, of which only the part at the output side is depicted in FIG. 1, comprises a tunnel 12 and a plurality of tanks 14 which contain a treatment fluid and into which the workpieces to be handled are to be immersed. In addition to guides 16, FIG. 1 depicts a second transfer station 18 in which the workpieces, which are held by their own carriages (not shown) and have passed through the system according to FIG. 1 in the plane of projection from left to right, are delivered to a downstream conveying means.

The system's main components shown in FIG. 1, such as the tunnel, tanks and a guidance mechanism with transfer station, are parts of the modular system that are common to all the various configurations of the overall system discussed below and are designated as a first module. In consequence, these parts are, so to speak, the basic components of the modular system described in more detail below.

Figure 2:
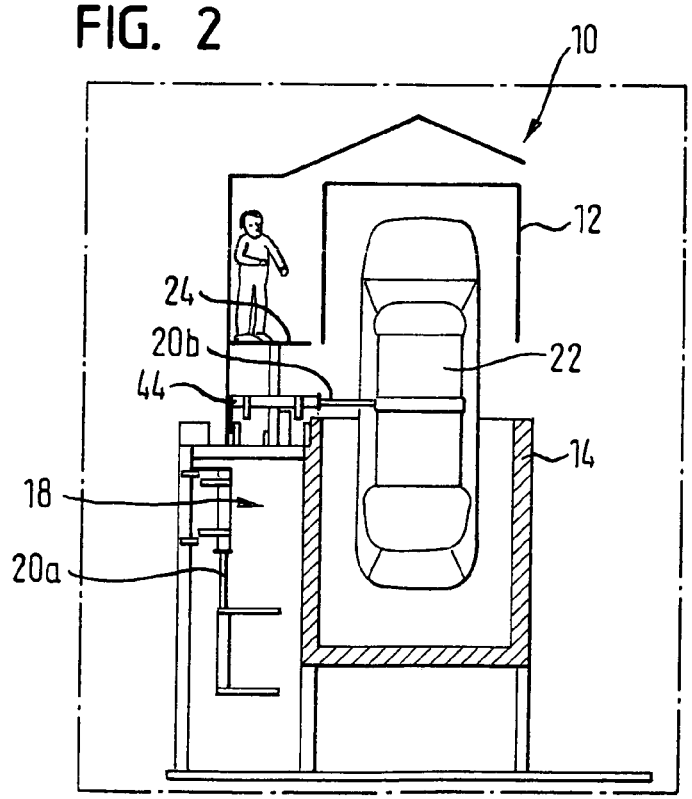
FIG. 2 is a sectional view of the device in the region of a treatment bath, the section being disposed perpendicular to the translational direction.

FIG. 2 shows schematically a section perpendicular to the direction of the translatory movement through the system and, likewise schematically indicated, tunnel 12, a treatment tank 14 and the first transfer station 18. The depiction according to FIG. 2 is intended to represent only by way of clarification the immersion of a vehicle chassis 22 into the tank 14, while at the same time the second transfer station 18 is depicted to correspond to an offset section that shows, on the one hand, the transfer station 18, but on the other hand passes through a tank 14. The region of the transfer station depicts a carriage 20a that corresponds to the subsequently explained embodiment according to FIG. 3 without its own drive means and is downwardly pivoted into a return position. At the same time, FIG. 2 also shows the carriage 20b that holds the vehicle chassis 22 in the region of the handling line. As will be explained later on the basis of more accurate diagrams, the carriage in the region of the transfer station is downwardly tilted through 90° around a pivoting shaft from the position corresponding to the carriage 20b into the position corresponding to the carriage 20a, whereby at the same time the handled vehicle chassis is released and can be transported away via a conveying means. The carriage assembly is located below a grating 24 accessible to personnel, as will be subsequently evident with even greater precision from FIG. 14.

As part of the system's modular construction according to the invention, the first module depicted in FIG. 1 can be combined with a second module that comprises variously designed carriages.

FIG. 3 depicts a carriage 20, as already schematically indicated in FIG. 2. The carriage 20 has an outer frame 26 and an inner frame 28 that is designed to hold the vehicle chassis to be handled. The designations "outer frame" and "inner frame" here are not intended to be interpreted to the extent that the inner frame is located within the enclosing outer frame. Rather, with reference to the system shown in FIG. 1, this designation was chosen to the extent that the outer frame moves outside the region of the handling devices, whereas the inner frame holds, in the region of the treatment tanks, those vehicle chassis that are to be handled. The outer frame 26 is provided with rollers 30 that roll on a guide device and hold the outer frame along the guide device, each in a defined position relative to the guide device.

The inner frame 28 is designed to revolve relative to the outer frame 26, with the inner frame being moveable around the rotary shaft 32 relative to the outer frame. The inner frame 28, furthermore, has holding projections 34 that are depicted only schematically in FIG. 3 and which serve to hold the workpieces to be processed, in this particular exemplary embodiment vehicle chassis. Moreover, the outer frame 26 is provided with coupling projections (50a, 50b). Finally, the outer frame has a connecting means (not shown) that serves to couple a pulling means or drive means for pulling a plurality of outer frames that are connected together, similar to a train that has several railway carriages.

The carriage without its own travel drive or rotary drive according to FIG. 3 has a lever assembly 38 having a plurality of lever arms and rollers 40 disposed at the ends of the lever arms, which interact with a guide rail that has inclined guide portions in order to cause a controlled rotation of the inner frame 28 that is under control at any time relative to the outer frame 26. For this purpose, the rollers 40 roll on the levers of the lever assembly 38 within the guide rail 48 depicted in FIG. 9. In the case of the upwardly and downwardly inclined portions of the guide rail, the inner frame 28 is pivoted around the rotary shaft 32 relative to the outer frame 26. The shape of the guide portions of the guide rail or control guidance rail therefore achieves desired complete and partial rotations in just one or alternating directions of rotation respectively.

The second module of the overall system, which system can be combined with the basic system as a system module, is formed by the guide rail 48 together with the carriage 20 depicted in FIG. 3 and the coupling means 50a, 50b between individual carriages and a pulling means in the region of the second transfer station for pulling the outer frames that have been connected together. If a carriage according to FIG. 3 is used, the overall system can be designed as a continuously conveying system.

The embodiment according to FIG. 4 uses a carriage 40 which differs from the carriage 20 only in terms of a single component. The difference is that instead of the lever assembly 38, the rotation around the rotary shaft 32 is effected by a rotary drive 42. The other members correspond to those in FIG. 3, with the result that reference can be made to the above explanations. The carriage according to FIG. 4 is used in the overall system 10 essentially with the same components of the second module as described above in conjunction with the carriage 20. Nevertheless, the carriage 40 according to FIG. 4 does not require a guide rail with inclined guide portions that interacted with the lever assembly in the embodiment according to FIG. 3.

Figure 5:
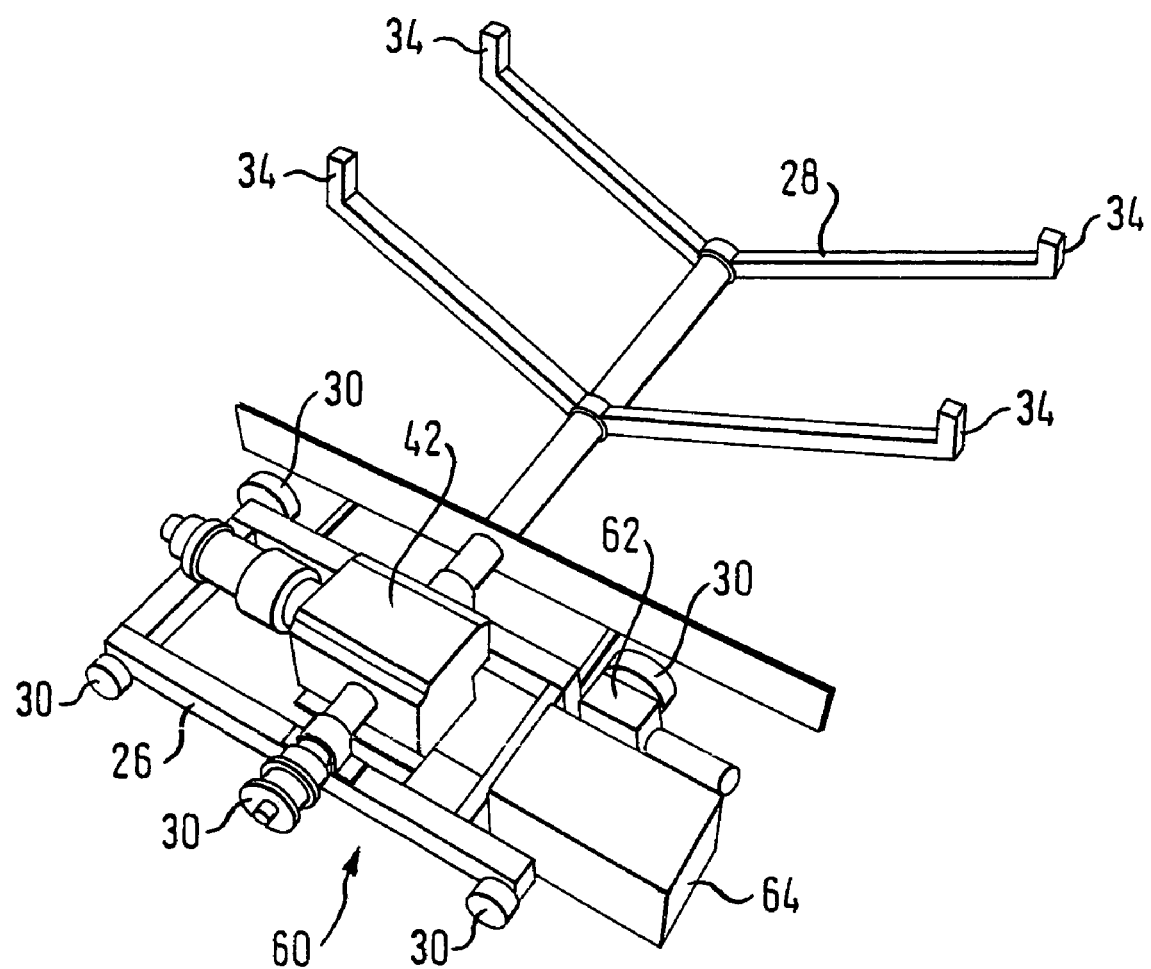
FIG. 5 shows a carriage that has both its own rotary drive and its own travel drive.

FIG. 5 shows a third alternative embodiment of a carriage in which the inner frame 28 once more corresponds to the inner frame according to the embodiments in FIGS. 2 and 4. The outer frame, however, has much smaller dimensions than in the embodiments according to FIGS. 3 and 4 and in turn has travel rollers 30 for interacting with the guide device (not shown). The essential difference between the carriage 60 according to FIG. 5 and the carriage 40 according to FIG. 4 is that not only the rotary drive 42, but also an additional travel drive 62 are provided, which, like the rotary drive 42, is controlled via an accompanying control means 64.

If a carriage 60 according to FIG. 5 is used, it is necessary to provide neither guide rails for controlling the rotational movement nor coupling means between the outer frames 26, nor connecting means or a return conveyor nor a guide device for pulling a series of carriages coupled together, because the carriages are independent of the translatory movement both in relation to the rotational movements to be executed and are independent in relation to the translatory movements of the other carriages. Provided the various carriages successively passing through the handling region therefore do not collide with one another, any translatory movements and rotational movements are possible in the case of the carriage 60 according to FIG. 5, whereas in the case of the carriage 40 according to FIG. 4, the translatory movement of the individual carriages is coupled together and only the rotational movement can be executed independently thereof. Finally, in the case of the carriage 20 according to FIG. 3, the translatory movements of the carriages that successively pass through the handling line are rigidly coupled together and, moreover, the rotational movement of each carriage is coupled to the translatory movement.

Figure 6:
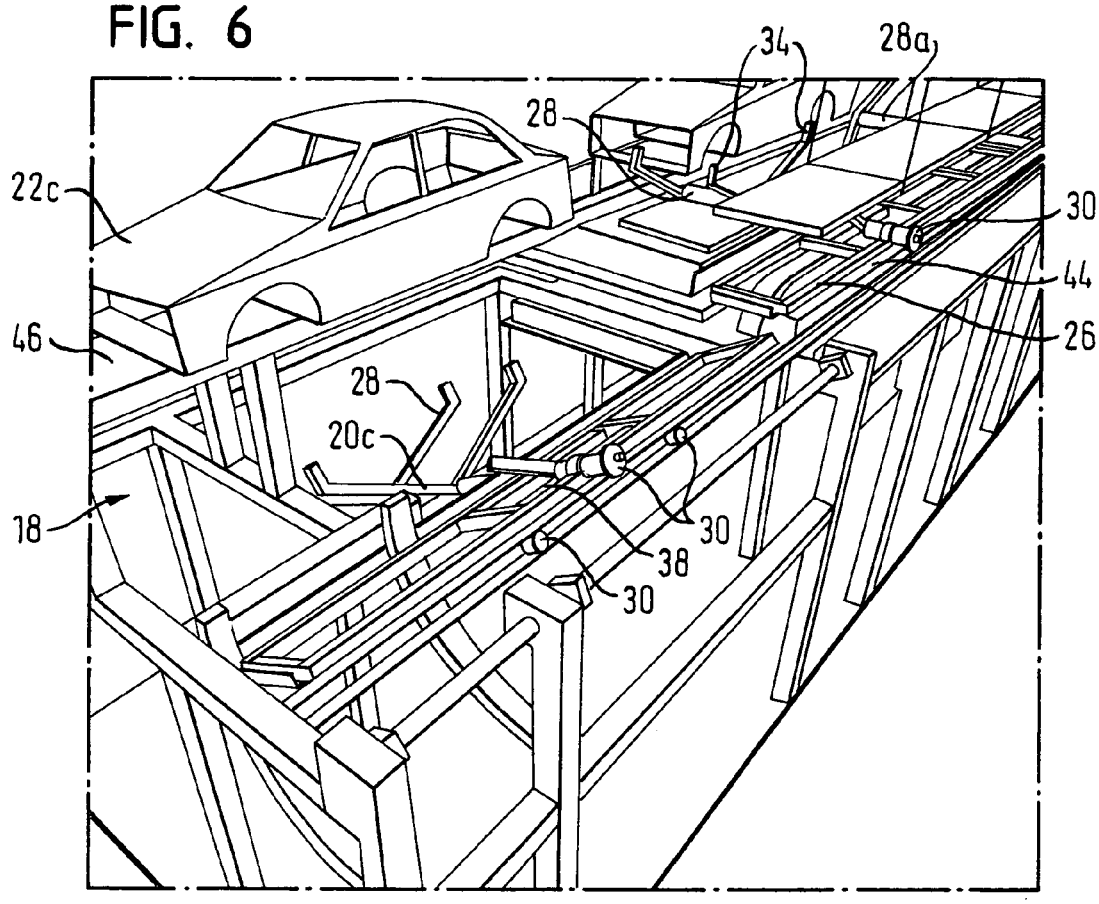
FIG. 6 shows schematically a portion of the device according to the invention in the region of the second transfer station having carriages corresponding to the embodiment according to FIG. 3.

FIG. 6 shows schematically the second transfer station 18 when carriages 20 according to FIG. 3 are used. The vehicle chassis 22 conveyed in the plane of projection from right to left are held on the holding means of the inner frames 28, and the outer frames 26 run, with the rollers 30, along guide rails 44, while the lever assembly 38 controls the rotational movement of the inner frames. Thus at the upper right-hand diagram edge there is visible an inner frame 28a that is pivoted in a straight line and dips a vehicle chassis into a treatment bath.

As shown by the carriage 20c, the carriage is downwardly tilted away in the region of the transfer station 18, and in doing so releases the vehicle chassis 22c held by the carriage. At the same time, the vehicle chassis is transported away via a second conveying means.

Figure 9:
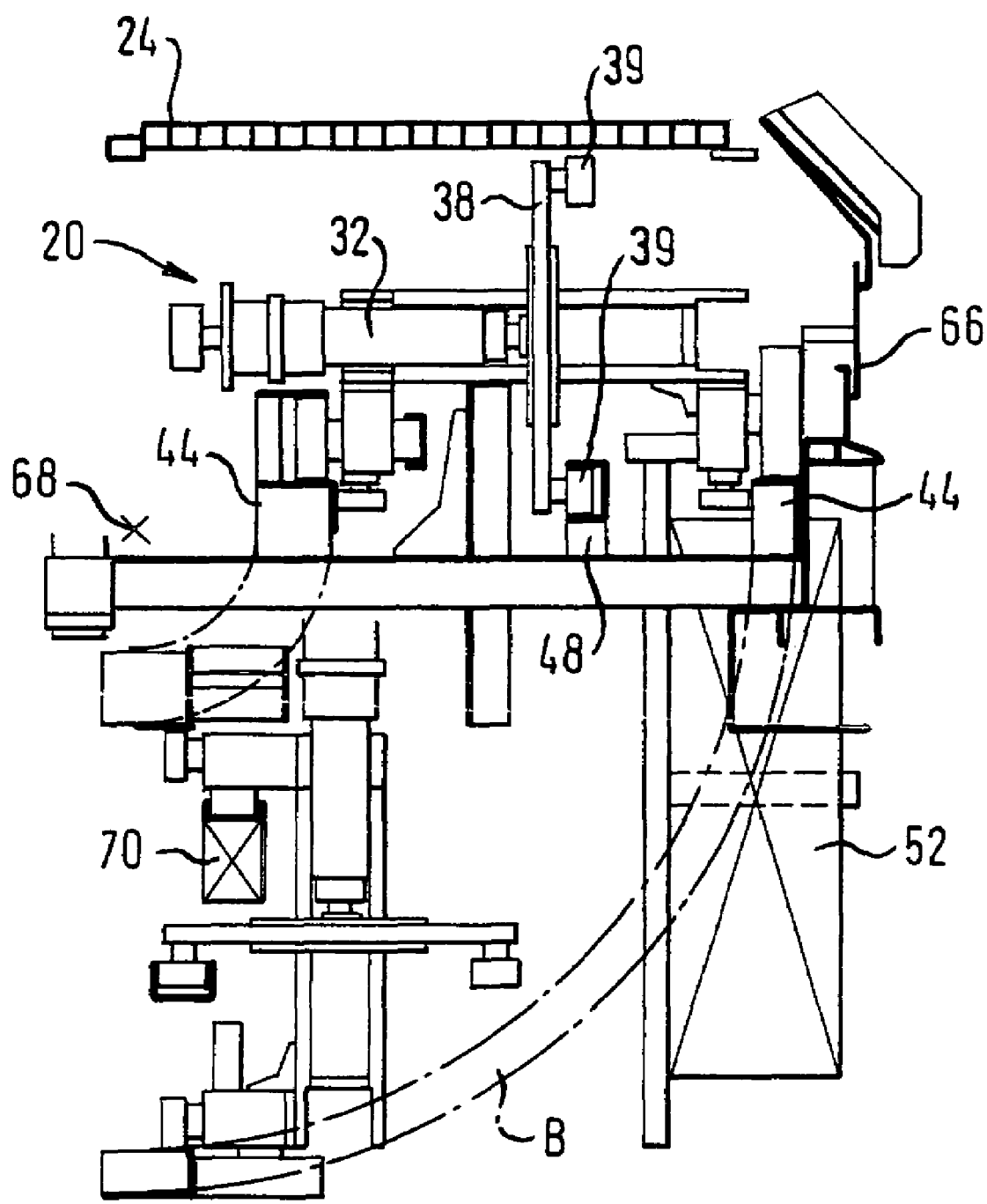
FIG. 9 shows, in a section perpendicular to the direction of translatory movement, the pivoting of the carriages in the region of the first and second transfer stations.
Figure 10:
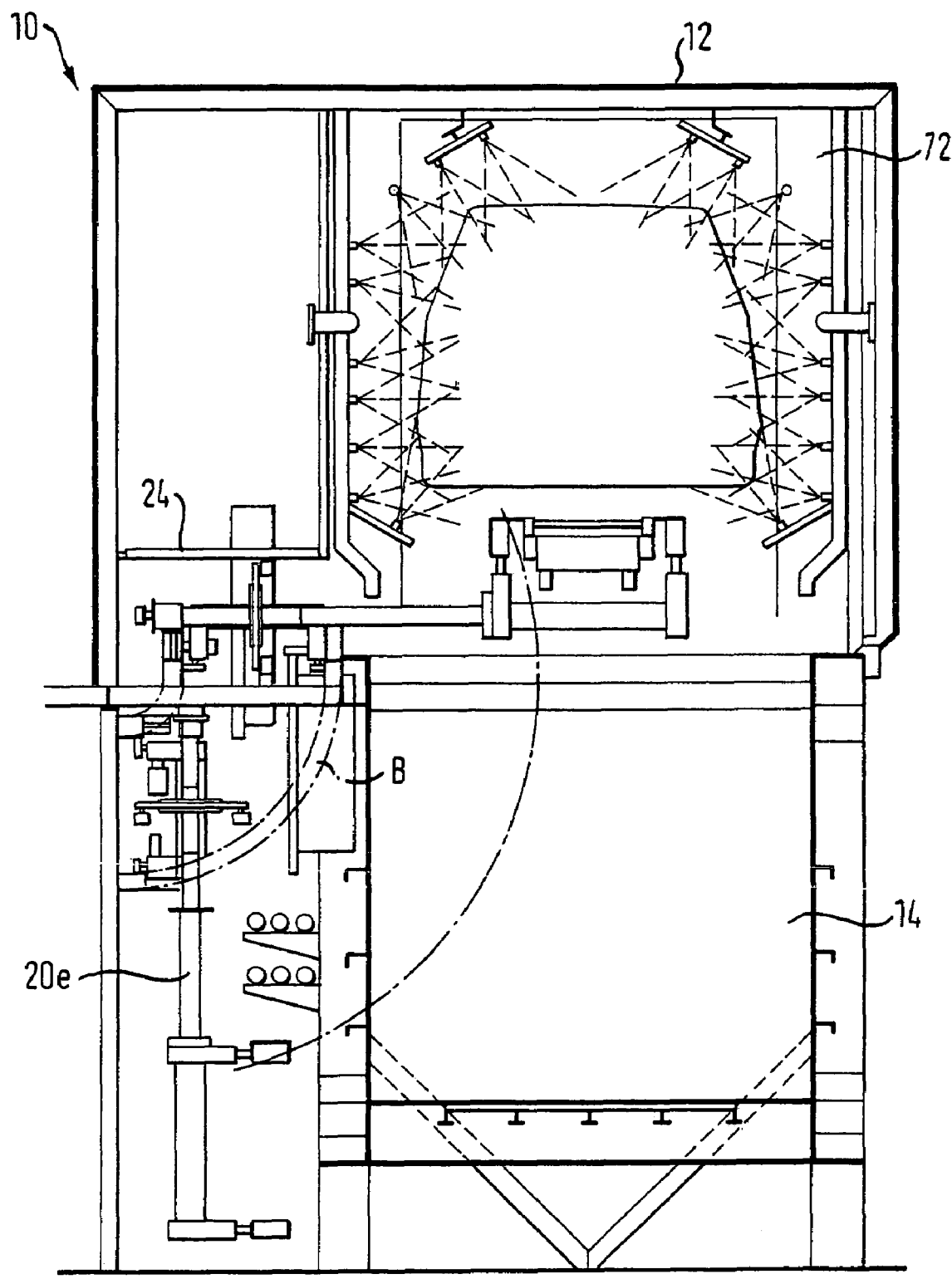
FIG. 10 shows a cross-section of the tunnel of the overall system in the region of a handling station, wherein once again carriages according to the embodiment in FIG. 3 are used.
Figure 11:
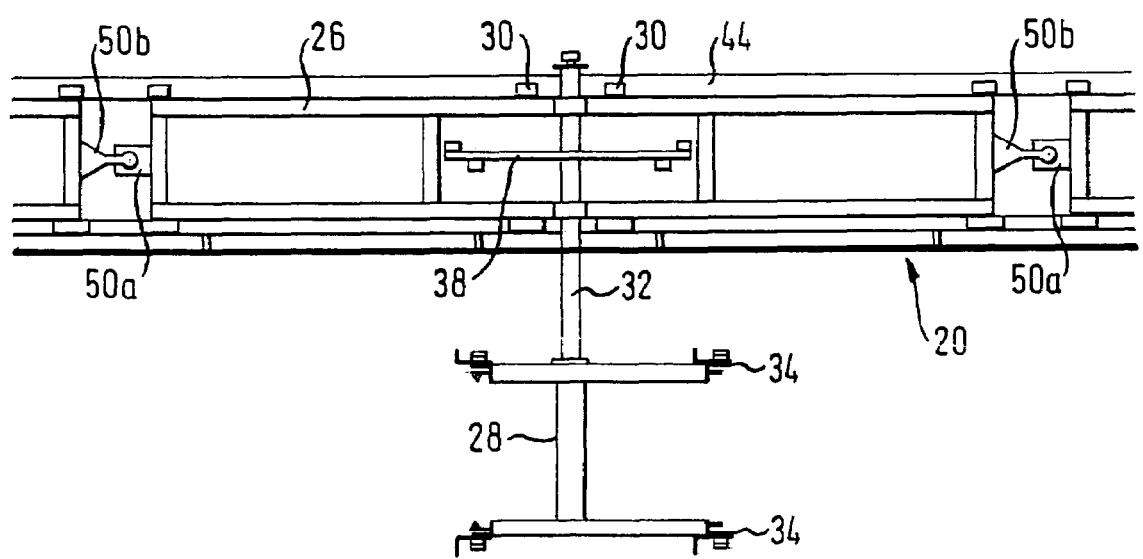
FIG. 11 shows schematically the coupling means for coupling together the individual carriages according to FIG. 3.

The process of pivoting the carriages is shown even more clearly in FIGS. 9 and 10.

Figure 7:
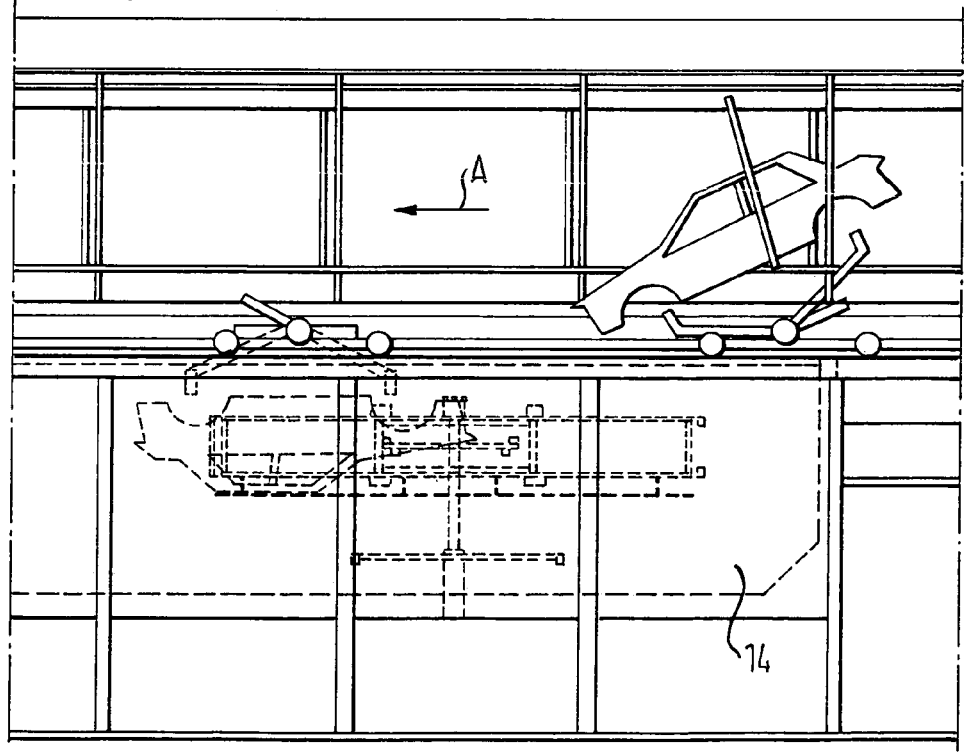
FIG. 7 shows schematically the movement of the vehicle chassis in which a carriage according to FIG. 3 is used.

FIG. 7 shows the movement of the carriages, with the vehicle chassis held by the carriages, into and through a tank 14. The carriages 20 undergo translatory movement in direction of movement A and the inner frame moves relative to the outer frame via the lever assemblies explained in FIG. 3 and which interact with a guide rail. In the example illustrated in FIG. 7, the vehicle chassis are immersed into the tank 14 upside down, i.e. with the engine hood first, and are transported through the tank in an upside down position. The advantage of transporting the vehicle chassis upside down through the tank 14 is that no sedimentation is produced on visible surfaces and, moreover, any cavities are readily flooded.

Figure 8:
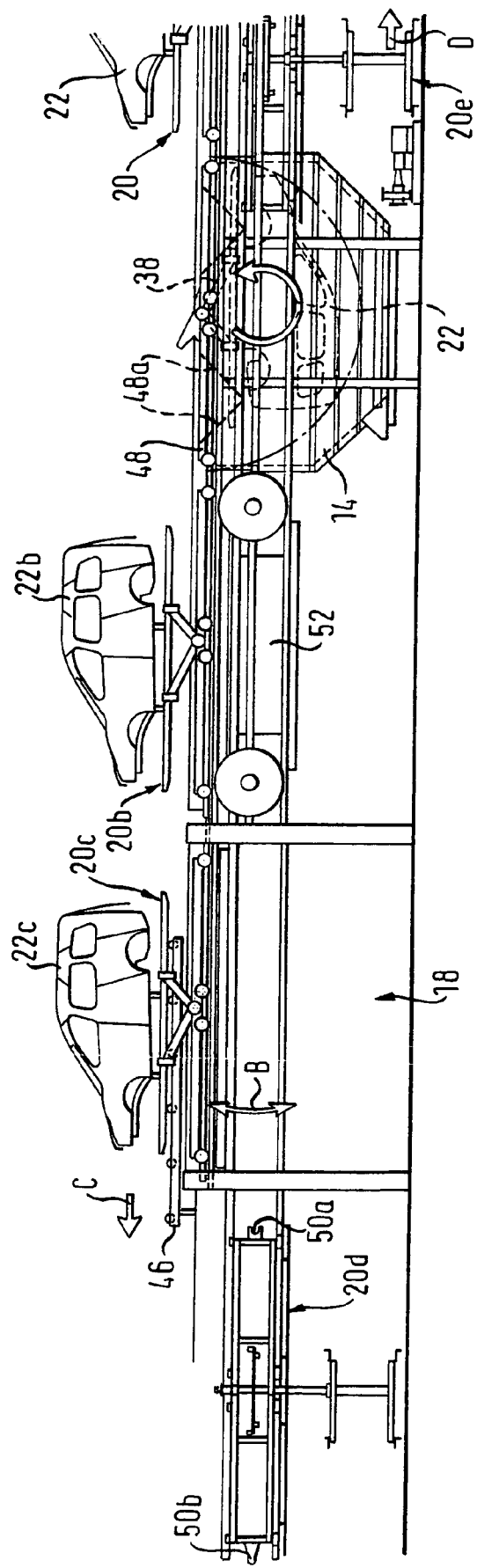
FIG. 8 is a view similar to FIG. 7 and shows schematically a device according to the invention having carriages according to the embodiment in FIG. 3 in the region of the treatment baths and the second transfer station.

FIG. 8 shows schematically the sequence of different handling stations of the system having carriages 20 according to the embodiment in FIGS. 2, 3, 6 and 7. The individual vehicle chassis 22 are each held on a carriage 20, with the rotational movement occurring in the region of the tank 14 as a result of the lever assembly 38 and of the interaction with a guide rail 48 with inclined guide portions 48a. Furthermore, the transfer station 18 is shown, which has a pivoting means to downwardly pivot the carriages 20 through 90° in direction B, as depicted by the carriage 20d on the left side of the plane of projection. In the region of the transfer station 18 when the carriage 20 is pivoted down, it is of course necessary to ensure that the handled vehicle chassis 22c is received by a conveying means 26 depicted schematically in FIG. 8. The conveying means can be designed such as to be located between the individual arms of the inner frame and when the carriage is pivoted down, the vehicle chassis is set down, as it were, on the conveying means 48 and transported out of the system in the direction of arrow C.

In the embodiment shown in FIG. 8, the individual carriages do not have their own rotary drive or travel drive, with the result that they are pulled through the entire system by means of a pull technique. The individual carriages 20 are provided with coupling projections, with each carriage 20 having a coupling projection 50a and a coupling projection 50b on the opposite side. The individual carriages are guided through the system such that the correspondingly shaped coupling projections 50a and 50b interlock with one another and therefore the individual carriages 20 can be pulled, just like in a train, by that carriage 20c which is respectively nearest to the transfer means 19 before the carriage there, as a result of the pivoting movement B, downwardly disengages positively from the carriage 20b disposed therebehind in the direction of movement. The coupling means may also have the hook shape shown in FIG. 3. After the carriage in the transfer station 18 has pivoted, it is gripped by conveyor belts and returned in the direction of movement D. One carriage during return travel is designated as 20e in FIG. 8.

If a carriage in the transfer station 18 has been downwardly tilted, the carriage 20b which is now nearest to the transfer station 18 and the remaining carriages coupled to this carriage must, with the aid of a drive 52 or another pulling means, be conveyed to the transfer station 18 in direction C of the translatory movement before the carriage 20b is tilted downward in the next step, and the immediately following carriage, which is at this point in time located in the region of drive 52, continues to convey, in the direction of arrow C, the remaining carriages coupled thereto, again in the manner of a train. In the same way, at the transfer station at the start of the handling line, a "new" carriage is again upwardly hooked, via the pivoting movement, into the chain of carriages located in the handling line.

That region, with the carriage 20d, which is positioned in FIG. 8 in the direction of movement in front of the transfer station 18 is a maintenance zone that enables operating personnel to have easy access to the carriages for servicing and repair work.

FIG. 9 depicts the downward tilting of a carriage. The carriage 20 is guided by means of the lever assembly 38 on the guide rails 44 beneath the aforementioned grating 24 that simultaneously serves as maintenance access. A continuous partition element 66 is disposed on the side facing the handling stations. In the transfer station 18, the entire carriage 20, as already depicted in FIG. 8, is downwardly pivoted through approx. 90° around a pivoting shaft 68, as indicated by the pivoting radii B. The pivoting shaft runs parallel to the translational direction C of the carriages and is disposed on that side of the carriages which faces away from the handling means, with the result that the downwardly tilted carriages cannot collide with the carriages in the region of the handling line. During downward tilting, not just the carriage alone, but also the guide rails in the region of the transfer station 18 are pivoted downwards, with the result that the carriage is accurately guided downwards during pivoting too. After pivoting downward, the carriage is rapidly transported by the conveyor belt 70 to the further transfer station disposed at the start of the system and in which the reverse movement sequence B takes place and the carriage is pivoted upwards. FIG. 9 might therefore equally represent the transfer means at the start of the handling line, because there is no difference between the two transfer stations in terms of movement sequences, apart from the fact that a fixed connection with the vehicle chassis to be handled has to be created in the first transfer means and has to be correspondingly separated again in the second transfer means.

FIG. 10 shows the same situation again, this time with a handling station 72 that effects spray treatment and as an alternative to the immersion baths used so far in the detailed description of preferred embodiments, can, of course, likewise be disposed within the tunnel 12 of the system. It is evident from the depiction according to FIG. 10 that the best possible advantage is taken of the existing space as a result of tilting the carriages down into the position designated as 20e, because the carriages can, during return travel, be guided alongside a possible tank 14 and the existing space is therefore taken advantage of in the best possible manner.

Figure 12:
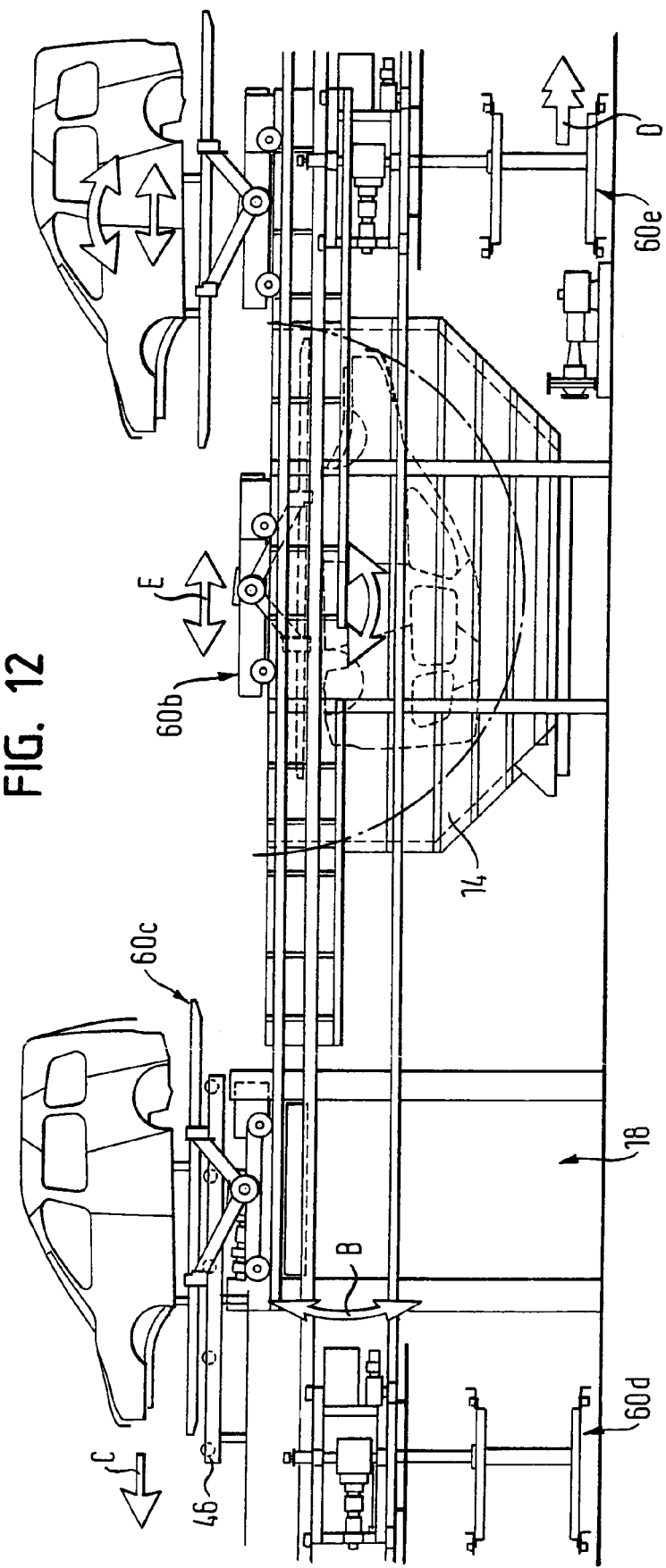
FIG. 12 shows a further embodiment of the invention having carriages according to FIG. 5, which carriages have both their own travel drive and their own rotary drive.

FIG. 12 shows an alternative embodiment of the invention that uses a carriage 60. The depiction corresponds essentially to that in FIG. 8, though the provision of carriages 60 with their own travel drive and their own rotary drive makes a guide rail with inclined portions 48a unnecessary. Furthermore, the carriages 60 are smaller in design and do not have any coupling projections 50 either. Finally, there is no need for any drive for pulling a carriage disposed next to the transfer station 18. In agreement with the designation according to FIG. 8, reference number 60c is used to designate that carriage which is located in the region of the transfer station and reference number 60b is used to designate that carriage which is located behind the carriage 60c in direction C of the translatory movement. The carriage 60d is located in a maintenance zone while the carriage 60e is rapidly returned in the direction of arrow D. Due to the independent travel and rotary drives, the travel direction can, moreover, be reversed region by region, as indicated by arrow E. Any movement of the carriages can therefore be performed within a handling region and particularly in the region of a tank 14. The transfer to the transfer stations is effected in the aforementioned manner that makes use of the carriages 20.

Figure 14:
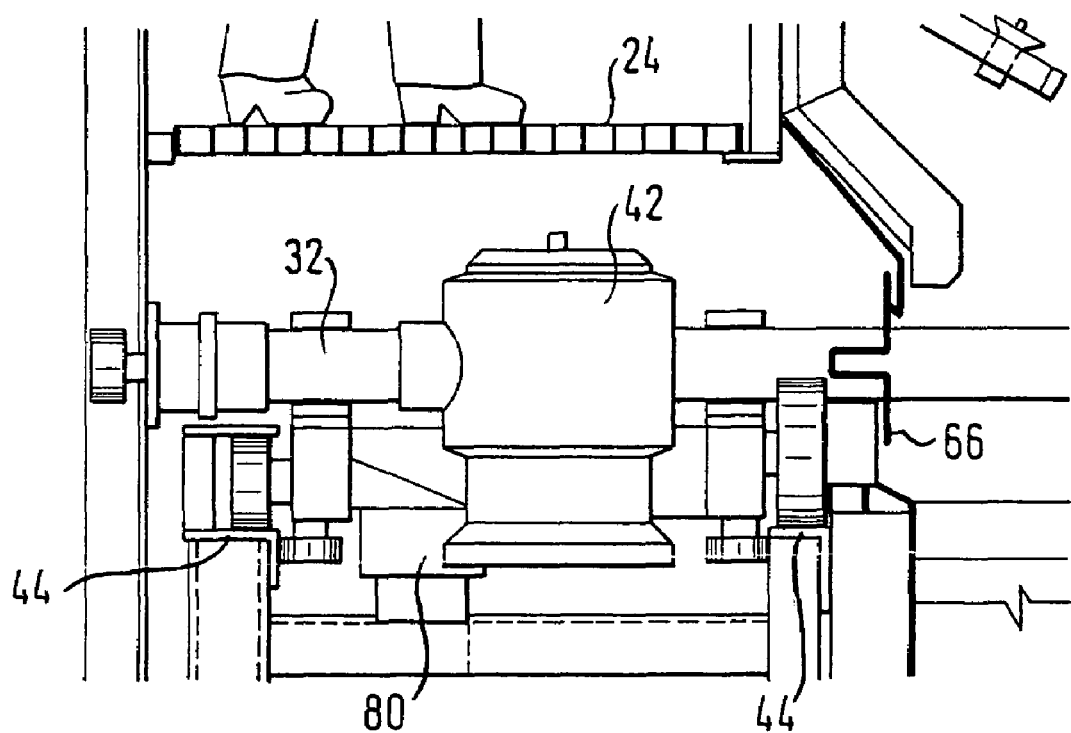
FIG. 14 shows in detail the arrangement of the travel drives in the embodiment according to FIG. 12 within the system.

The transfer of information and power between the guide device as part of the first module and the carriages 60 is preferably effected via an inductive current transfer 80, as is evident from FIG. 14. It therefore becomes apparent that the system according to the embodiment in FIG. 8 is extremely easy to refit as the system according to FIG. 12 in that chiefly various travel drives are used and the aforementioned additional adaptation measures are taken.

In the same way, of course, one of the hybrid solutions that were described in detail above and in which the carriages have just a single drive, is conceivable too, as shown by way of example in FIG. 4. In a hybrid solution, the roller conveyor 46 for conveying the vehicle chassis to be handled, the pivoting means for the carriages and the rapid return in which conveyor belts are used, correspond to those in the embodiments described above.

Figure 13:
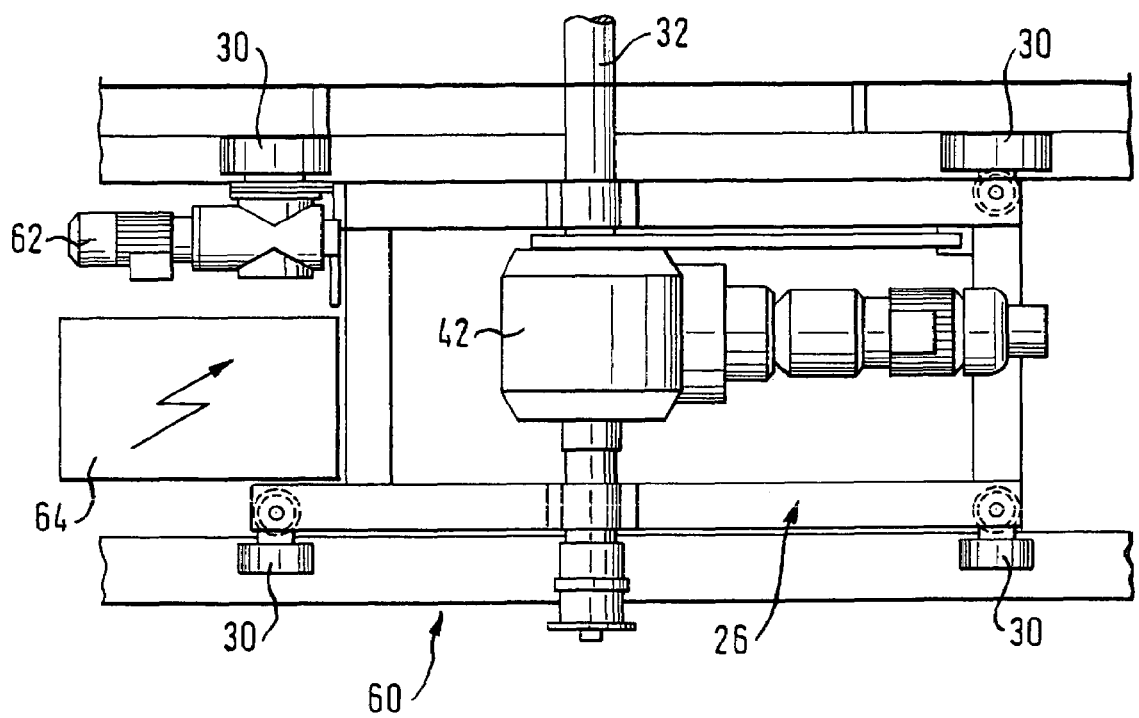
FIG. 13 shows a top view of such a travel drive having its own drive units.

FIG. 13 once more shows a top view of a travel drive 60 that has both a travel drive 62 and a rotary drive 42 and an accompanying control means 64. The inner frame 28 is no longer shown in the embodiment according to FIG. 13; the depiction ends with the rotary shaft 32.

The advantages of the system according to the invention consist in the interchangeability of the system modules (first module and second module) while retaining the basic system as a first module having the basic components of tunnel, tanks and guidance mechanism with transfer stations. The system requires little space, because no space is lost beneath the system and the smaller dimensions, furthermore, lead to savings in steel construction. Additionally, bearings and joints can be positioned outside the immersion media and optimum shaft sealing is achieved as a result of accompanying seals. With little refitting work, the system can, in the form of the electronic version shown in FIG. 12, be equipped with individual control of the carriages, separate travel and rotary drives, and maximum flexibility of the movement of the individual carriages. Alternatively, the embodiment according to FIG. 8 can also be realized using carriages that are rigidly linked together, whereby maximum reliability and a very high throughput are attainable. In contrast to conventional solutions using carriages that are linked together rotationally, the advantage of using fewer carriages is, however, also achieved by means of the rapid return travel. It is not necessary to adjust chains either. Yet hybrid solutions between the two aforementioned solutions, in which for example the carriages are linked together and only the rotary motors are individually controlled, are conceivable, too. Such a hybrid solution may achieve a high throughout while simultaneously retaining high degree of flexibility. Particularly the solutions with a separate rotary drive have the advantage that the chassis can be easily pivoted up and down within the tank and can drip off at a freely selectable angle above the tank. The solutions that use an additionally present independent travel drive have the further advantage that the chassis can be transported to the immersion reservoir at a high speed while the processing time inside the immersion reservoir or in a different kind of handling means can be reduced while keeping an unvarying chassis dwell time throughout the handling line. The main advantage, however, lies in the high degree of flexibility of the device, which can be produced at lower cost as a result of common components for the various customized versions and, moreover, offers scope for future production modifications to or reconfigurations of the system. Additionally, the special-purpose return travel of the carriages minimizes the space needed by the overall system.

The invention claimed is:

1. A device for modular construction for handling workpieces (22), in particular vehicle chassis (22), said device comprising
   a first module having
   a handling line (12) with one or more handling regions (14) for the surface treatment of said workpieces (22);
   a guide device (44) along said handling line (12) and disposed only on one side of said handling line (12); and
   a second module having one or more carriages (20; 40; 60) to which said workpieces (22) may be fixed and which may be moved along said guide device (44); wherein
   said carriages (20; 40; 60) each comprise
   an outer frame (26);
   an inner frame (28) that revolves around a rotary shaft (32) relative to said outer frame (26), whereby said workpieces (22) may be fixed to said inner frame (28);
   said rotary shaft (32) of each carriage disposed in an essentially horizontal and perpendicular manner In relation to the direction of movement (C) of said carriages (20; 40; 60) along said handling line (12), and
   at least one (60) of said carriages (20; 40; 60) having both rotary and travel drives (42, 64).

2. A device according to claim 1,
   wherein said guide device comprises at least one rail (44).

3. A device according to claim 2,
   wherein said carriages (20; 40; 60) have rollers (30) that roll on said at least one rail (44) of said guide device.

4. A device according to claim 1, wherein said first module further comprises
   a first transfer station (18) that interacts with a first conveying means for supplying said workpieces (22) to be handled; and
   a second transfer station (18) that interacts with a second conveying means (46) for removing said handled workpieces (22).

5. A device according to claim 4,
   wherein said first module further comprises
   return means for conveying said carriages from said second transfer station (18) to said first transfer station (18).

6. A device according to claim 5,
   wherein said return means (70) has a switching means for transferring carriages into or out of a maintenance zone.

7. A device according to claim 4,
   wherein said carriages (20; 40; 60) in said second transfer station (18) are pivoted through an angle of approx. 90° around a pivoting shaft (68) in the region of said guide device (44), and said carriages in said first transfer station (18) are pivoted back through the same angle in the opposite direction.

8. A device according to claim 7,
   wherein said pivoting shaft (68) is disposed essentially parallel to said guide device (44) and on that side of said guide device (44) which faces away from said one or more handling regions (14).

9. A device according to claim 1,
   wherein said carriages (20; 40; 60) and said guide device (44) are designed such that during the handling of said workpieces (22), all bearings are at any time disposed outside said one or more handling regions (14).

10. A device according to claim 1,
    further comprising a rotary drive (42) on each carriage, said rotary drive being connected at the output side in a rotationally rigid manner to said inner frame (28) of said carriages (40; 60).

11. A device according to claim 10,
    wherein the transfer of information and/or power from said first module to said carriages is effected contactlessly, particularly inductively.

12. A device according to claim 1, further comprising
    a travel drive (64) on each carriage for the translatory movement of said carriages (60) along said handling line (12)
    said rotary drive (42) arranged for generating rotational movement of said inner frame (28) relative to said outer frame (28); and
    the translatory movement being independent of the rotational movement.

13. A device according to claim 1, wherein
    said carriages (20; 40; 60) are structured and arranged to move along said guide device (44) with each said carriage (20; 40; 60) supporting an individual workpiece (22), and
    said second module is structured and arranged such that said one or more carriages (20; 40; 60) pivot about an axis (68) extending substantially parallel to a direction of movement (C) of the workpieces (22) along the handling line (12).

14. A device according to claim 13, wherein said axis (68) is positioned to one side of said handling line (12) and regions (14) extending substantially parallel to the direction of movement (C) of the workpieces (22) along the handling line (12).

15. A device for modular construction for handling workpieces (22), in particular vehicle chassis (22), said device comprising
    a first module having
    a handling line (12) with one or more handling regions (14) for the surface treatment of said workpieces (22);
    a guide device (44) along said handling line (12); and
    a second module having one or more carriages (20; 40; 60) to which said workpieces (22) may be fixed and which may be moved along said guide device (44); wherein
    said first module is structured and arranged to cooperate and be combined with various types of said second module,
    said first module further comprises
    a first transfer station (18) that interacts with a first conveying means for supplying said workpieces (22) to be handled; and
    a second transfer station (18) that interacts with a second conveying means (46) for removing said handled workpieces (22),
    said carriages (20; 40; 60) comprise
    an outer frame (26); and
    an inner frame (28) that revolves around a rotary shaft (32) relative to said outer frame, whereby said workpieces (22) may be fixed to said inner frame (28);

said rotary shaft (32) of each carriage is disposed in an essentially horizontal and perpendicular manner in relation to the direction of movement of said carriages (20; 40; 60) along said handling line (12), and further comprising means for lifting and/or inclining said rotary shaft (32) relative to said outer frame.

16. A device for modular construction for handling workpieces (22), in particular vehicle chassis (22), said device comprising a first module having a handling line (12) with one or more handling regions (14) for the surface treatment of said workpieces (22);

a guide device (44) along said handling line (12); and a second module having one or more carriages (20; 40; 60) to which said workpieces (22) may be fixed and which may be moved along said guide device (44); wherein said first module Is structured and arranged to cooperate and be combined with various types of said second module, said first module further comprises a first transfer station (18) that interacts with a first conveying means for supplying said workpieces (22) to be handled; and a second transfer station (18) that interacts with a second conveying means (46) for removing said handled workpieces (22), said first module further comprises return means for conveying said carriages from said second transfer station (18) to said first transfer station (18), and said return means are in the form of a conveyor belt (70) or chain conveyor.

17. A device for modular construction for handling workpieces (22), in particular vehicle chassis (22), said device comprising a first module having a handling line (12) with one or more handling regions (14) for the surface treatment of said workpieces (22);

a guide device (44) along said handling line (12); and a second module having one or more carriages (20; 40; 60) to which said workpieces (22) may be fixed and which may be moved along said guide device (44); wherein said carriages (20; 40; 60) are structured and arranged to move along said guide device (44) with each said carriage (20; 40; 60) supporting an individual workpiece (22), said second module is structured and arranged such that said one or more carriages (20; 40; 60) pivot about an axis (68) extending substantially parallel to a direction of movement (C) of the workpieces (22) along the handling line (12), and said second module is structured and arranged such that said carriages (20; 40; 60) additionally pivot about an axis (32) extending substantially horizontally and perpendicularly to the direction of movement (C) of the workpieces (22) along the handling line (12).

18. A device according to claim 17, wherein said second module is structured and arranged such that said one or more carriages (20; 40; 60) pivot approximately 90° about said axis (68) extending substantially parallel to the direction of movement (C) of the workpieces (22) along the handling line (12).

* * * * *